US011363162B2

(12) United States Patent
Thein et al.

(10) Patent No.: US 11,363,162 B2
(45) Date of Patent: Jun. 14, 2022

(54) SYSTEM AND METHOD FOR AUTOMATED ORGANIZATION OF SCANNED TEXT DOCUMENTS

(71) Applicant: Toshiba TEC Kabushiki Kaisha, Shinagawa-ku (JP)

(72) Inventors: Hla T. Thein, Aliso Viejo, CA (US); Methee Phoboonme, Rancho Santa Margarita, CA (US)

(73) Assignee: Toshiba TEC Kabushiki Kaisha, Shinagawa-ku (JP)

( * ) Notice: Subject to any disclaimer, the term of this patent is extended or adjusted under 35 U.S.C. 154(b) by 0 days.

(21) Appl. No.: 17/007,658

(22) Filed: Aug. 31, 2020

(65) Prior Publication Data
US 2022/0070328 A1    Mar. 3, 2022

(51) Int. Cl.
| H04N 1/21 | (2006.01) |
| H04N 1/00 | (2006.01) |
| G06K 9/62 | (2022.01) |
| G06F 40/20 | (2020.01) |
| H04N 1/024 | (2006.01) |
| G06K 9/00 | (2022.01) |

(52) U.S. Cl.
CPC .......... *H04N 1/2166* (2013.01); *G06F 40/20* (2020.01); *G06K 9/00456* (2013.01); *G06K 9/6215* (2013.01); *H04N 1/00411* (2013.01); *H04N 1/024* (2013.01)

(58) Field of Classification Search
CPC .................................... H04N 1/2166
USPC ....................................... 358/403
See application file for complete search history.

(56) References Cited

U.S. PATENT DOCUMENTS

2021/0319345 A1* 10/2021 Kumar .............. G06F 16/90324

* cited by examiner

Primary Examiner — Jacky X Zheng
(74) Attorney, Agent, or Firm — Ulmer & Berne LLP

(57) ABSTRACT

A system and method provides automated prediction of filenames and storage locations for scan files generated from a user's scan of their financial documents. A prediction model is generated for the user based on weighted values derived from preexisting filenames and preexisting storage locations for their stored electronic files. Text or images from each scan document is analyzed and weighted and compared to the user's prediction model and a suggested name and storage location is automatically generated. The suggestions are confirmed or corrected by the user prior to storage, and any corrections are used to update the user's prediction model.

20 Claims, 5 Drawing Sheets

SYSTEM AND METHOD FOR AUTOMATED ORGANIZATION OF SCANNED TEXT DOCUMENTS

TECHNICAL FIELD

This application relates generally to automated naming of and storing of scan files in accordance with a prediction model associated with an identified user.

BACKGROUND

Document processing devices include printers, copiers, scanners and e-mail gateways. More recently, devices employing two or more of these functions are found in office environments. These devices are referred to as multifunction peripherals (MFPs) or multifunction devices (MFDs). As used herein, MFPs are understood to comprise printers, alone or in combination with other of the afore-noted functions. It is further understood that any suitable document processing device can be used.

People accumulate personal documents, such as receipts, tax records, utility bills bank statements or credit card statements. These documents frequently exist in paper printouts. If a user wishes to retain electronic copies, they must scan each document, and save the scan document with a name of their choice in a location of their choice. Financial records such as tax papers, utility bills, mortgage information, and bank and credit card statements are some of the more common types of scanned documents. After a user scans a document into a file such as a PDF file, they normally rename the file and move it into a folder that is organized according to the user's preference. For example, a tax document may be named "2019 Form 1099—Bank of America" and placed in a folder called "Income Taxes\2019", or a gas bill dated February of 2019 may be named "2019-02" and placed in a folder called "Gas Company". Storage may be on a user's device, such as computer, smartphone or tablet. Storage locations may also be networked, such as accessible on a local area network or via cloud based storage.

Doing the forgoing means that a user must repeat the process for each document of interest. This can be tedious and time consuming. A user may also store a document in a wrong location in instances such as when they store a first scan document in a desired location and forget to alter the storage location for a subsequently scanned document with different content.

BRIEF DESCRIPTION OF THE DRAWINGS

Various embodiments will become better understood with regard to the following description, appended claims and accompanying drawings wherein:

DETAILED DESCRIPTION

Figure 1:
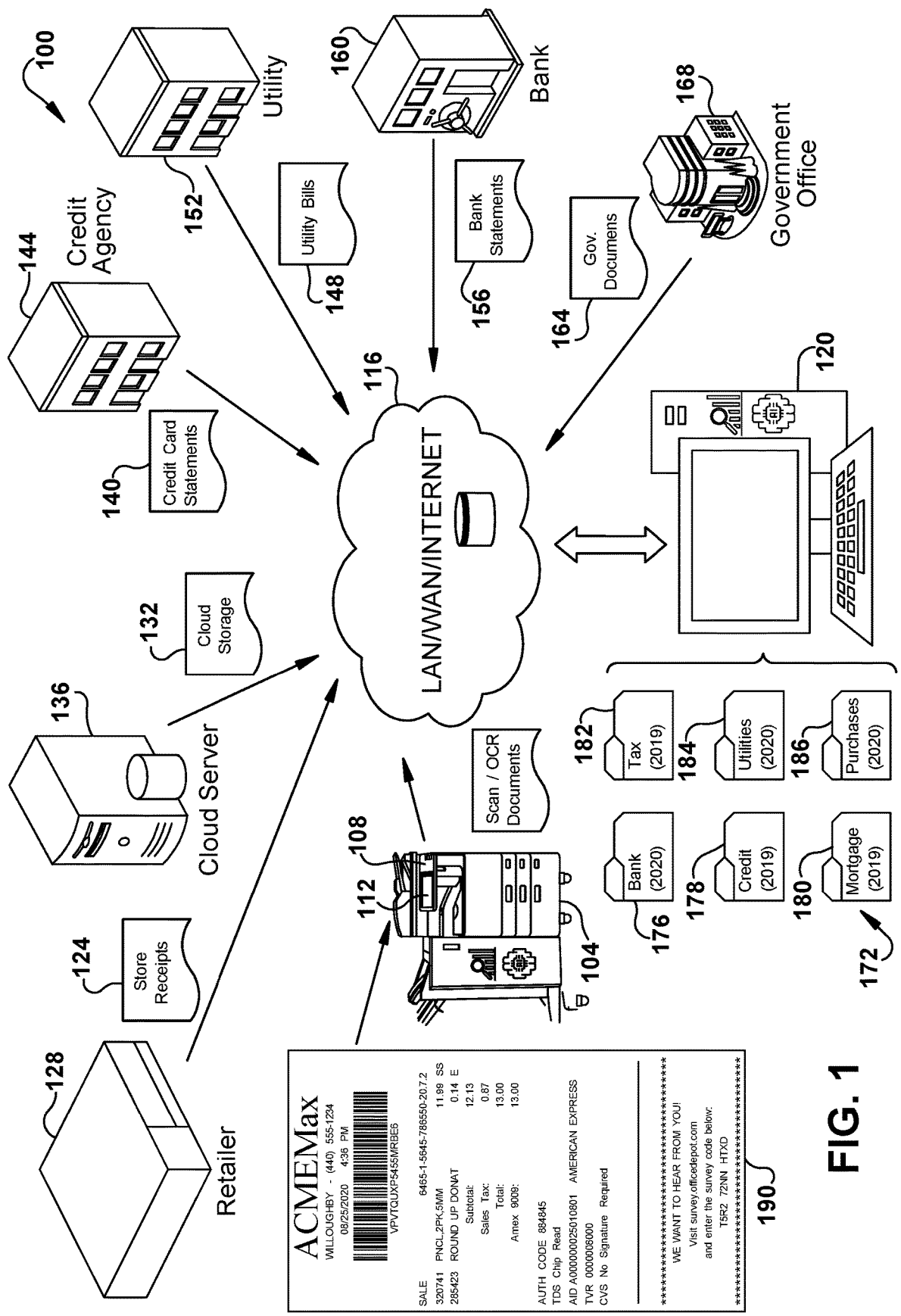
FIG. 1 is an example embodiment of a system for automated organization of scanned text documents.

The systems and methods disclosed herein are described in detail by way of examples and with reference to the figures. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

In example embodiments herein, software running on a computer or multifunction printer accesses a user's files located on device storage, cloud storage or local area network storage. The system accesses the user's past electronic documents, such as PDF files of scanned documents, in order to analyze text and images in the files and create a prediction model of how the user has named those documents and organized them. Based on this model, the system predicts how to name PDF files generated from newly scanned documents and predict a location, such as a folder, to place the files. The model is suitably saved in file storage along with the user's data so that the same software will be able to handle many users and make predictions according to each user or the same user with different way of organizing his/her documents.

In an example embodiment of a use case, a user creates an account on a multifunction peripheral. The system prompts the user to supply storage locations for their scanned documents, such as a cloud storage folder. The system then scans content and folders from the user supplied information to determine patterns of document names in the folder, similarity of words in each document in the same folder and similarity of images in each document in the same folder. Model data is then created and saved in the user's cloud storage. This process can take some time, so the system can notify the user when it's complete, such as by sending an email. A user may also have multiple cloud storage accounts that store different documents in different ways.

Once a prediction model has been created and stored for the user, they can then scan other documents. The system analyzes the text and images of the documents and groups related pages together as one document, compares similarity score of text and images of each document to the score saved at different folder to find where each document should be saved. The system makes a prediction and presents the name of the file and the path of the folder to ask for confirmation. The user can either confirm or enter in correct name of the file and path to the correct folder. If the user supplies corrected information, the system learns from its mistake and updates the user's prediction model.

A prediction model is created based on text or images contained within a scanned document. Text, including that from optical character recognition ("OCR") of images, is processed to extract relevant data such as keywords, numbers, dates, addresses, phone numbers, names, account numbers, and the like. Additional information may be gleaned by determining roughly where each of such appears on the page.

Example embodiments further include a scan and connection to cloud and scan folders, as well as content of files in the folder, to learn how a user organizes files by analyzing the existing file name pattern, and content similarity (text and images) and saves the learned data at each folder in the cloud storage Example embodiments further include a system that uses its scanner to scan documents, analyze its content, group pages of related content into one document, find the cloud folder that has similar documents based on text and image similarity Example embodiments further include a system that can use content of the scanned document to find cloud storage folder that a user stores similar content and recommends file name that matches pattern of file names in the existing folders.

In accordance with the subject application, FIG. 1 illustrates an example embodiment of a system 100 for automated organization of scanned text documents that includes one or more MFPs, illustrated by way of example by MFP 104. MFP 104 includes a user interface 108 suitably comprised of touchscreen 112. MFP 104 is in network communication with network cloud 116, suitably comprised of any wireless or wired local area network (LAN) or a wide area network (WAN) which can comprise the Internet, or any suitable combination thereof Also in network communication are one or more digital devices including for example workstation 120, as well as network connections with various entities for direct receipt of electronic documents, such as receipts or statements for an associated user. Examples include store receipts 124 from retailer 128, cloud storage files 132 from cloud server 136, credit card statements 140 from credit agency 144, utility bills 148 from utility 152, bank statements 156 from bank 160 and government documents 164 from government office 168. A user operating from a networked device, such as workstation 120, has storage locations 172 for various document types. Storage locations 172 are suitably local, stored on the user's LAN, in cloud storage, or any combination thereof. Example storage locations include folders 176 for 2020 bank documents, 178 for 2019 credit documents, 180 for 2019 mortgage documents, 182 for 2019 tax documents, 184 for 2020 utility documents and 186 for 2020 purchase documents. When a user secures a new paper document, such as receipt 190, they scan it to a scan file, such as a PDF, suitably using a scanner of MFP 104. Content of the scan file are analyzed, including text and images. Text is suitably extracted via an OCR of generated scan files. Analyzed scan file content is then used with a model associated with the user, suitably via MFP 104 or workstation 120, to provide a suggested file name and storage location in a manner detailed further below.

Figure 2:
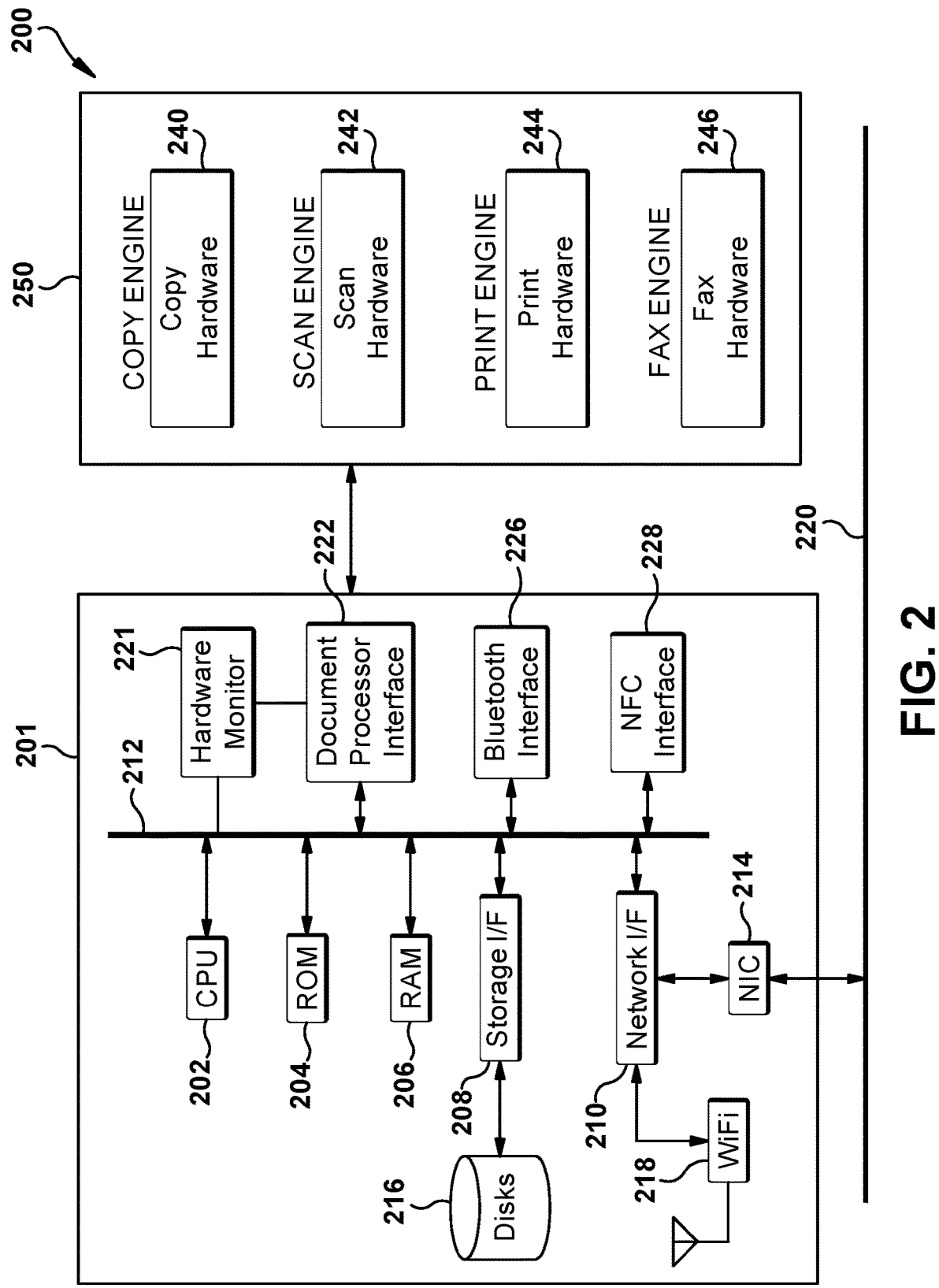
FIG. 2 is an example embodiment of a networked digital device comprising a multifunction peripheral.

Turning now to FIG. 2 illustrated is an example embodiment of a networked digital device comprised of document rendering system 200 suitably comprised within an MFP, such as MFP 104 of FIG. 1. It will be appreciated that an MFP includes an intelligent controller 201 which is itself a computer system. Included in controller 201 are one or more processors, such as that illustrated by processor 202. Each processor is suitably associated with non-volatile memory, such as read only memory (ROM) 204, and random access memory (RAM) 206, via a data bus 212.

Processor 202 is also in data communication with a storage interface 208 for reading or writing data with storage 216, suitably comprised of a hard disk, optical disk, solid-state disk, cloud-based storage, or any other suitable data storage as will be appreciated by one of ordinary skill in the art.

Processor 202 is also in data communication with a network interface 210 which provides an interface to a network interface controller (NIC) 214, which in turn provides a data path to any suitable wired or physical network connection 220, or to a wireless data connection via a wireless network interface, such as WiFi 218. Example wireless connections include cellular, Wi-Fi, wireless universal serial bus (wireless USB), satellite, and the like. Example wired interfaces include Ethernet, USB, IEEE 1394 (FireWire), Lightning, telephone line, or the like. Processor 202 is also in data communication with a hardware monitor 221, suitably amassing state data from subassemblies, sensors, digital thermometers, or the like, and suitably including digital state date including device codes, such as device error codes. Processor 202 can also be in data communication a document processor interface 222, with BLUETOOTH interface 226 and NFC interface 228 via data path 212.

Processor 202 can also be in data communication with any suitable user input/output (I/O) interface (not shown) which provides data communication with user peripherals, such as displays, keyboards, mice, track balls, touch screens, or the like.

Document processor interface 222 is suitable for data communication with MFP functional units 250. In the illustrated example, these units include a copy engine, suitably comprised of copy hardware 240, a scan engine, suitably comprised of scan hardware 242, a print engine, suitably comprised of print hardware 244 and a fax engine, suitably comprised of fax hardware 246. These subsystems together comprise MFP functional hardware 250. It will be understood that functional units are suitably comprised of intelligent units, including any suitable hardware or software platform.

Figure 3:
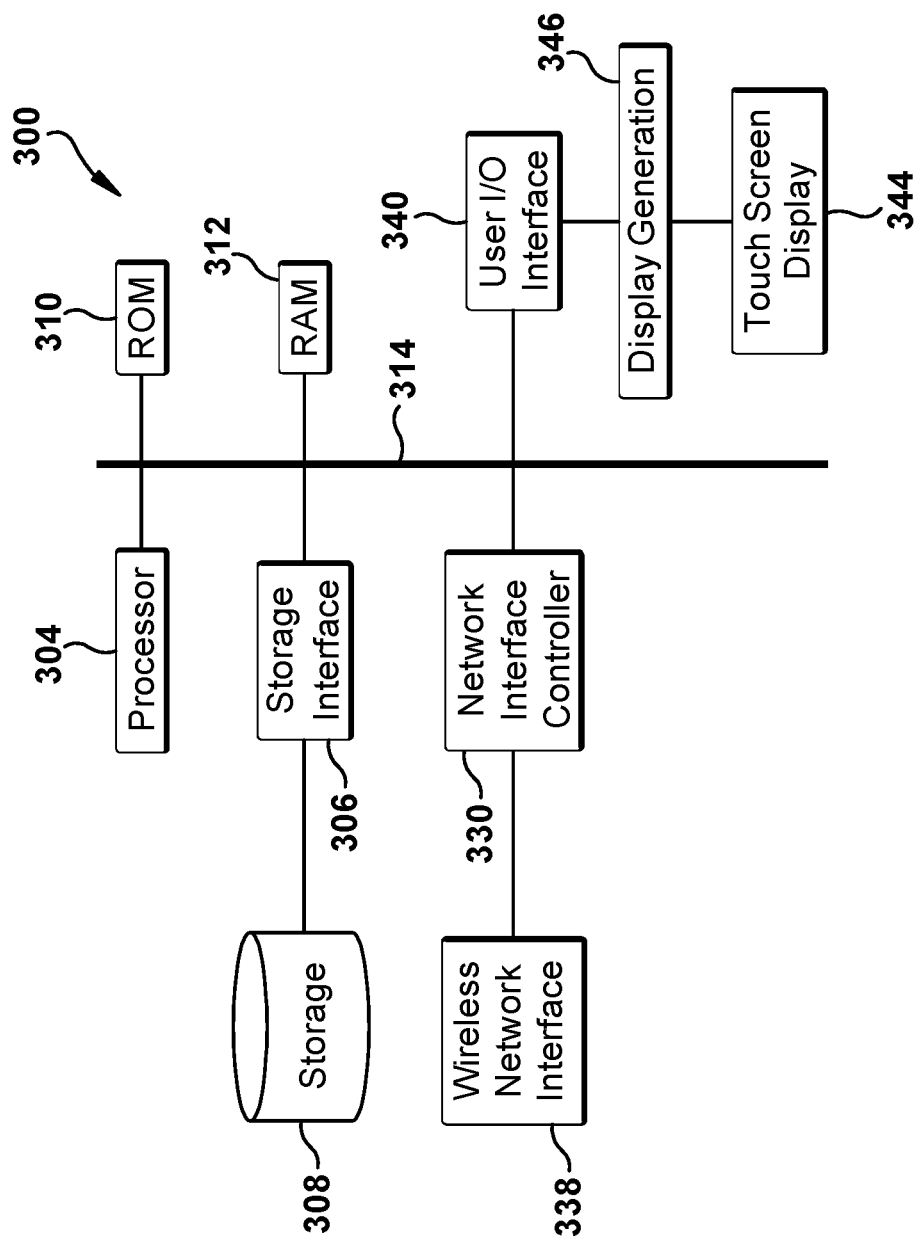
FIG. 3 is an example embodiment of a digital device system.

Turning now to FIG. 3, illustrated is an example of a digital device system 300 suitably comprising workstation 120 and cloud server 136 of FIG. 1. Included are one or more processors, such as that illustrated by processor 304. Each processor is suitably associated with non-volatile memory, such as read only memory (ROM) 310 and random access memory (RAM) 312, via a data bus 314.

Processor 304 is also in data communication with a storage interface 306 for reading or writing to a data storage system 308, suitably comprised of a hard disk, optical disk, solid-state disk, or any other suitable data storage as will be appreciated by one of ordinary skill in the art.

Processor 304 is also in data communication with a network interface controller (NIC) 330, which provides a data path to any suitable network or device connection, such as a suitable wireless data connection via wireless network interface 338. A suitable data connection to an MFP or server is via a data network, such as a local area network (LAN), a wide area network (WAN), which may comprise the Internet, or any suitable combination thereof. A digital data connection is also suitably directly with an MFP or server, such as via BLUETOOTH, optical data transfer, Wi-Fi direct, or the like.

Processor 304 is also in data communication with a user input/output (I/O) interface 340 which provides data communication with user peripherals, such as touch screen display 344 via display generator 346, as well as keyboards, mice, track balls, touch screens, or the like. It will be understood that functional units are suitably comprised of intelligent units, including any suitable hardware or software platform.

Figure 4:
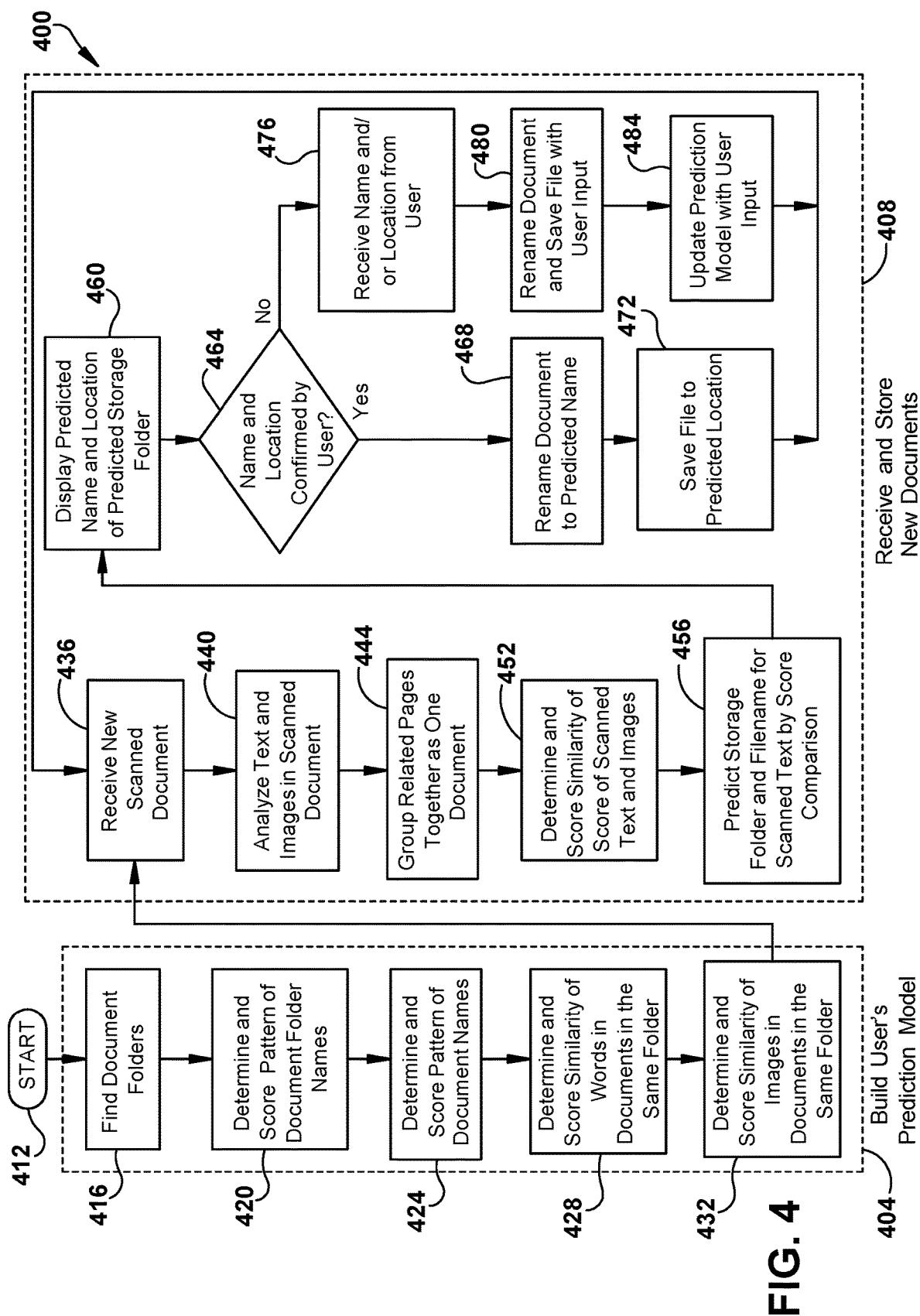
FIG. 4 is a flowchart of an example embodiment of a system for automated organization of scanned text documents.

FIG. 4 is a flowchart 400 of an example embodiment of automated organization of scanned text documents. The system includes two basic portions, one illustrated by block 404 which builds a user's prediction model, and one illustrated by block 408 which receives and stores new documents. The process commences at block 412 and proceeds to block 416 where file locations, such as file folders, are found for an identified user. Next, at block 420, document folder names are analyzed and document folder names scored.

Document names for documents in the same folder are determined and scored at block 424. Document images are determined and scored for documents in the same folder at block 428. Such determination and scoring results in a prediction model for the identified user from block 404.

When a prediction model exists for the identified user, a new document for that user is scanned at block 436. Text and images in the resultant scan file are analyzed at block 440, and related pages are grouped to form one document at block 444. By way of example, a user may scan multiple pages comprising two separate documents. The system can look for similar information, such as dates and a sequence of page numbers and form two single, unified documents automatically. Next, at block 452, similarity of scanned text and images is compared to the user's prediction module, and a predicted storage folder and filename is generated at block 456 and displayed to the user at block 460. If the user confirms the predicted document name and storage location at block 464, the document filename is changed to the predicted name at block 468 and saved to the predicted file location at block 472. The system then returns to block 436 to await a new scan document.

If the user does not confirm the predicted name and/or file location at block 464, it proceeds to block 476 where corrected information obtained from the user. The document is named and saved with the corrected or verified information from the user at block 480, and the user's prediction model is updated at block 484 to reflect the new user input. The process then returns to block 436 to await a new scan document.

Figure 5:
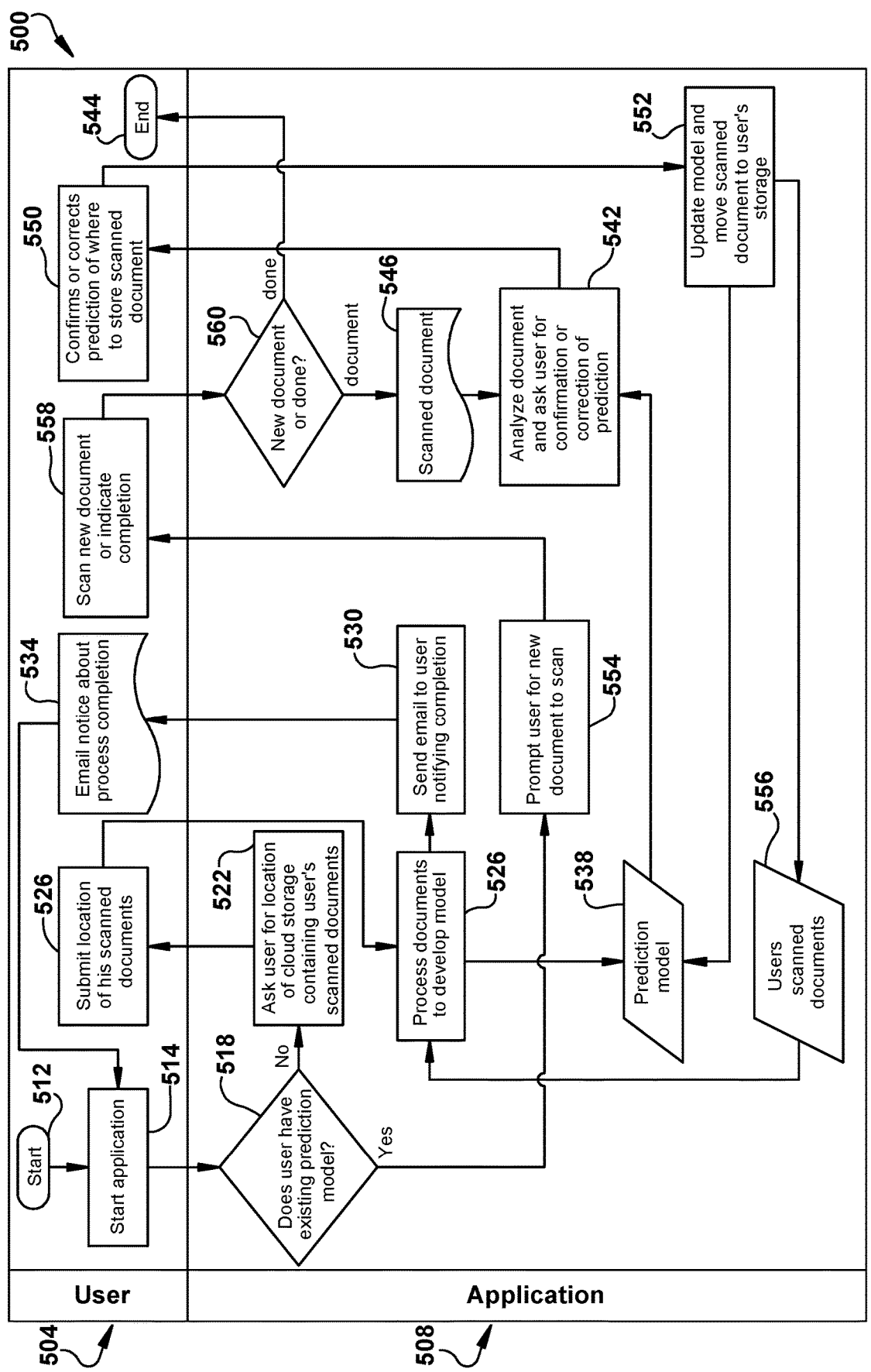
FIG. 5 is a system diagram for an example embodiment of automated organization of scanned text documents.

FIG. 5 is a system diagram 500 for an example embodiment of automated organization of scanned text documents. The illustration includes user section 504 and application section 508 and depicts user/device interaction. The process commences at block 512 and proceeds to block 514 where an identified user commences operation. A test is made at block 518 to determine if the user already has an associated prediction model. If not, the process moves to block 522 to generate a prompt and receive from the user one more locations where their documents are stored, and the process for building the user's model commences at block 526. Once the model is built, the system communicates completion to the user at block 530, such as via email 534. The process then returns to block 514. When the user has an active, associated prediction model, the process reaches block 538. At block 542, analysis is made of a user's document prediction of a scan file 546 and confirmation or correction is secured, such as confirming a predicted filename. The user responds to a prompt and confirms or corrects a storage location at block 550 and the user's model is corrected, if needed, at block 552. The user's scanned documents 556 are passed to block 526 to build the user's model. The process then returns to block 538.

If it is determined at block 518 that the user already has a prediction model, the process moves to block 554 where the user scans a new document after being prompted. New documentation is obtained at block 558 if existent. If a new document is found at block 560, a new scan is obtained and analyzed as with scanned document 546 at block 542.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:

1. A system comprising:
   memory;
   a network interface;
   a user interface including a display and a user input; and
   a processor,
   the processor configured to identify a user,
   the processor further configured to associate a prediction model with an identified user in accordance with an analysis of electronic document data for each of a plurality of documents associated with the user,
   the processor further configured receive an image of a scan document associated with the user,
   the processor further configured to analyze text or images in the scan document,
   the processor further configured to determine and score features in analyzed text or images,
   the processor further configured to generate a predicted file name for the scan document in accordance with a comparison of score features in analyzed text or images and the prediction model,
   the processor further configured to generate a predicted storage location for the scan document in accordance with the comparison,
   the processor further configured to generate a display of the predicted file name and the predicted storage location, and
   the processor further configured to selectively store the scan document with the predicted file name in the predicted storage location upon receipt of an instruction by the user via the user interface responsive to a generated display.

2. The system of claim 1 wherein the processor is further configured store the scan document with a file name or a storage location specified by the user via the user interface responsive to the generated display.

3. The system of claim 2 wherein the processor is further configured to update the prediction model in accordance with the file name or storage location specified by the user.

4. The system of claim 1 wherein the processor is further configured to generate the predictive model, wherein to generate model, the processor is further configured to:
   retrieve a plurality of preexisting electronic documents associated with the user from one or more identified storage locations associated with the user,
   analyze text or images in each of the preexisting electronic documents,
   determine and score patterns of storage location names,
   determine and score patterns of document names for the preexisting documents,
   determine and score similarity of words in preexisting documents stored in the same location, and
   determine and score similarity of images in preexisting documents stored in the same location.

5. The system of claim 4 wherein the processor is further configured to identify the storage locations in accordance with location input received from the user via the user interface.

6. The system of claim 5 wherein the identified storage locations include cloud storage or local storage locations with a local area network.

7. The system of claim 4 wherein the processor is further configured to selectively group related pages of the existing electronic documents as one document in accordance with generation of the predictive model.

8. The system of claim 4 wherein predictive model includes storage location names comprised of folders named for storage of one or more of tax papers, utility bills, mortgage information, bank statements, credit card statements or receipts associated with purchases of goods or services.

9. A method comprising:
identifying a device user;
associating a prediction model with an identified user in accordance with an analysis of electronic document data for each of a plurality of documents associated with the user;
receiving an image of a scan document associated with the user;
analyzing text or images in the scan document;
determining and scoring features in analyzed text or images;
generating a predicted file name for the scan document in accordance with a comparison of score features in analyzed text or images and the prediction model;
generating a predicted storage location for the scan document in accordance with the comparison;
generating a display of the predicted file name and the predicted storage location; and
selectively storing the scan document with the predicted file name in the predicted storage location upon receipt of an instruction by the user via the user interface responsive to a generated display.

10. The method of claim 9 further comprising storing the scan document with a file name or a storage location specified by the user via the user interface responsive to the generated display.

11. The method of claim 10 updating the prediction model in accordance with the file name or storage location specified by the user.

12. The method of claim 9 further comprising generating the predictive model by:
retrieving a plurality of preexisting electronic documents associated with the user from one or more identified storage locations associated with the user,
analyzing text or images in each of the preexisting electronic documents,
determining and score patterns of storage location names,
determining and score patterns of document names for the preexisting documents,
determine and score similarity of words in preexisting documents stored in the same location, and
determining and scoring similarity of images in preexisting documents stored in the same location.

13. The method of claim 12 further comprising identifying the storage locations in accordance with location input received from the user via the user interface.

14. The method of claim 13 wherein the identified storage locations include cloud storage or local storage locations with a local area network.

15. The method of claim 12 further comprising selectively grouping related pages of the existing electronic documents as one document in accordance with generation of the predictive model.

16. The method of claim 12 wherein predictive model includes storage location names comprised of folders named for storage of one or more of tax papers, utility bills, mortgage information, bank statements, credit card statements or receipts associated with purchases of goods or services.

17. A multifunction peripheral comprising:
a memory storing a prediction model associated with an identified user, the prediction model including weighted score values associated with storage locations and filenames for a plurality of documents associated with the user;
a scanner configured to generate an electronic scan document from a user selected scan of a tangible document by the identified user; and
a processor;
the processor configured to analyze and text or images in the scan document,
the processor further configured to generate a predicted document name and storage location for the scan document in accordance with analyzed text and images and the prediction model, and
the processor further configured to store the scan document with the predicted document name in the predicted storage location.

18. The multifunction peripheral of claim 17 further comprising a user interface including a display and user input, and wherein the processor is further configured to store the scan document with a user selected name instead of the predicted name in accordance with instructions received from the user.

19. The multifunction peripheral of claim 17 further comprising a user interface including a display and user input, and wherein the processor is further configured to store the scan document in a user selected storage location instead of the predicted storage location in accordance with instructions from the user.

20. The multifunction peripheral of claim 17 wherein the scan document is comprised of a plurality of pages, and wherein the processor is further configured to generate a modified scan document from two or more pages determined to be related in accordance with analysis of text or images in the scan document.

* * * * *